June 12, 1962  J. P. CUCHES  3,039,027
ROTARY ACTUATOR
Filed Feb. 19, 1959
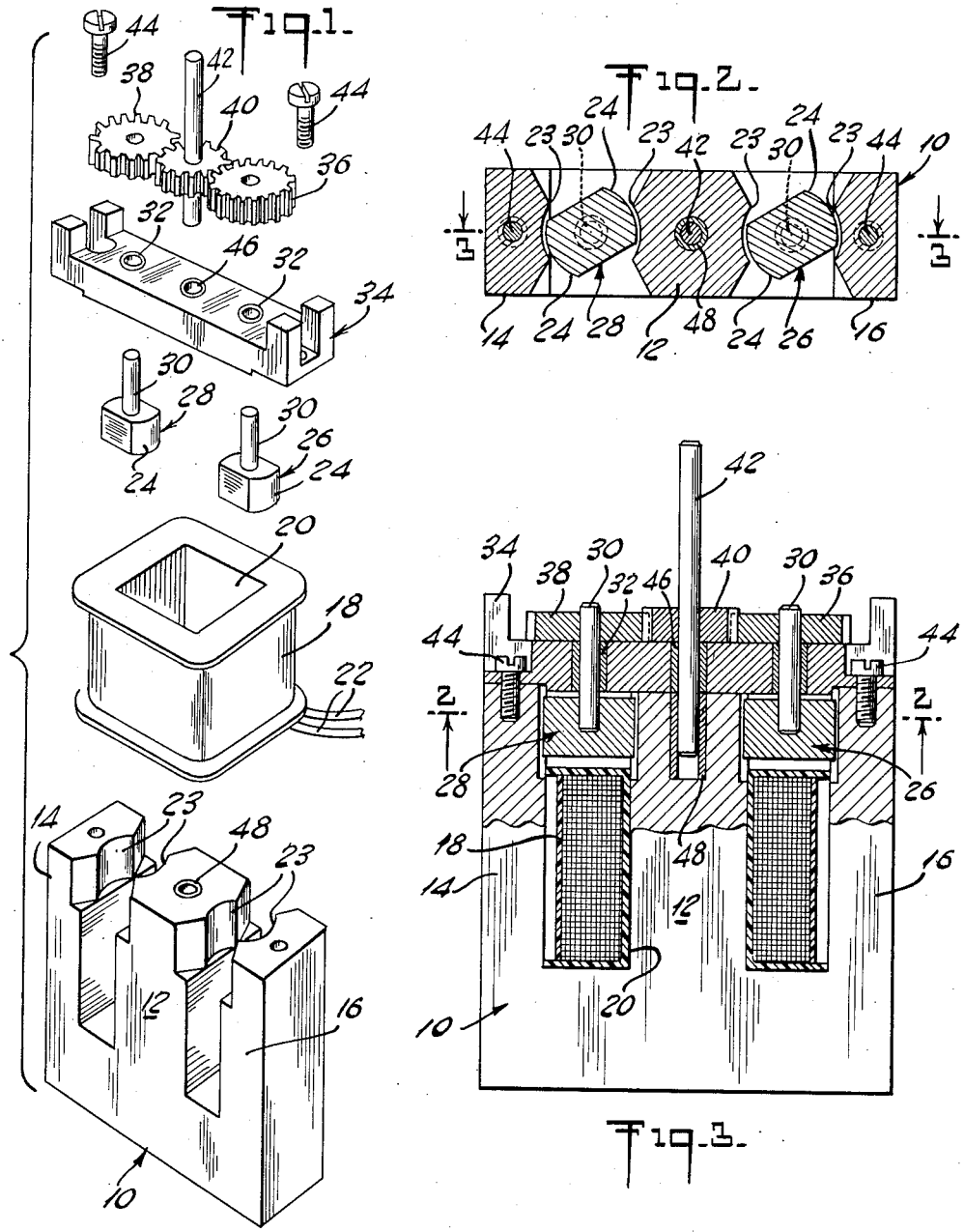
INVENTOR
John P. Cuches
BY
Moses, Nolte, & Nolte
ATTORNEYS

United States Patent Office 3,039,027
Patented June 12, 1962

3,039,027
ROTARY ACTUATOR
John Peter Cuches, Middle Village, N.Y., assignor, by mesne assignments, to Daco Instrument Company, Brooklyn, N.Y., a partnership of New York
Filed Feb. 19, 1959, Ser. No. 794,334
10 Claims. (Cl. 317—189)

This invention relates in general to rotary actuators or solenoids and in particular to a new and useful angular displacement type solenoid of simplified magnetic structure, including parts which may be arranged to give an infinite variety of torque characteristics over the rotative range of the actuator.

With rotary actuators of the type with which the invention is concerned it is essential that the design be adaptable for operating all types of equipment which requires particular actuating torque characteristics for successful operation over a wide range of angular displacement. In previous solenoid constructions of this type, it was necessary to completely redesign the solenoid for each piece of equipment with which the actuator would be utilized.

The present invention provides a simplified rotary solenoid construction including a substantially E-shaped stator having three upstanding pole faces curved to complement the pole faces of rotors which are mounted to operate between adjacent pole faces. The invention provides an arrangement whereby the turning force produced on each of these rotors is transmitted to a central shaft which is rotatably mounted on the central pole piece. The arrangement permits interchanging of the ratio of the gears on the rotor shafts and the main actuator shaft, which receives actuation therefrom, in order to achieve any one of a number of desired torque or turning force characteristics during the displacement of the main actuator shaft. The novel construction of the rotor and stator makes it possible to change the torque characteristics of the solenoid merely by changing the driving gears to the central actuator shaft, or by changing the air gap configurations between each of the rotors and its associated stator pole face.

In accordance with the invention both the rotor and the stator are of either a laminated or solid magnetic construction, the stator being supplied with a coil activating winding. The parts may be easily machined to give desired air gap configurations betwen each of the rotors and the stator in order to vary the torque characteristics of each rotor. These characteristics may be further modified by the driving gears which rotate the central main actuator shaft. A feature of the invention is the easy adjustment of the torque characteristic over the angular turning range of each of the rotors. Each of the rotors of this construction may be made to rotate within various angular displacement ranges, by selecting, in the initial manufacture, rotor and stator air gap geometries in which the gap length and turning force may be easily determined for each point in the rotor turning cycle in accordance with design requirements.

Another feature of the invention is the novel mounting of each of the rotors and the central actuator shaft. This construction provides for efficiency of operation, with a minimum of flux leakage, and permits the wide range of use of the solenoid by simple adjustments in the driving gears as mentioned above.

Accordingly, it is an object of this invention to provide an improved rotary solenoid.

Another object of this invention is to provide a rotary solenoid easily adjustable for use over a wide angular turning range and for an infinite variety of torque characteristics.

A further object of this invention is to provide a rotary solenoid including a substantially E-shaped stator and two rotors mounted in the gaps between adjacent legs of the stator and including a gear drive operating a central actuator shaft which is mounted for rotation above the central pole piece of the stator.

A further object of this invention is to provide a rotary solenoid which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

In the drawings:

FIG. 1 is an exploded perspective view of a solenoid constructed in accordance with the invention;

FIG. 2 is a horizontal section taken on the line 2—2 of FIG. 3; and

FIG. 3 is a partial elevation and partial transverse section of the solenoid indicated in FIG. 1.

Referring to the drawings in particular the invention as embodied therein includes a rotary actuator having a substantially E-shaped stator generally designated 10. The stator 10 is provided with a central upstanding pole piece 12 and two upstanding end pole pieces 14 and 16. An actuating coil 18 is provided with a central opening 20, and the coil 18 is positioned on the stator 10, with the central pole piece 12 extending upwardly through the opening 20. The coil is actuated through electrical connections indicated at 22.

In accordance with the invention the upstanding upper opposing faces 23 of each of the adjacent pole pieces 14 and 12, and 12 and 16 are curved in accordance with the turning characteristics desired to complement similarly curved cooperating faces 24 of small sized rotors generally designated 26 and 28, respectively. Each of the rotors 26 and 28 is provided with a central upstanding shaft 30 which is rotatably mounted within bearing openings 32 provided in a stator cover piece generally designated 34. The rotor 28 is positioned between the faces 23 of the stator pole pieces 12 and 14, while the rotor 26 is positioned to rotate between the faces 23 of pole pieces 12 and 16.

The upper ends of the shafts 30 above the stator cover piece 34 are each provided with a driving gear, designated 36 for rotor 26 and 38 for rotor 28. These gears 36 and 38 mesh with a central gear 40 affixed to an actuator shaft 42. In accordance with the invention, the gears 36, 38 and 40 are chosen to give the desired turning force and angular displacement characteristic to the actuator shaft 42. For example, by increasing the ratio of teeth in the gears 36 and 38 to tht gear 40, a greater displacement of shaft 42 may be obtained. In order to facilitate interchange of the gears 36 and 38 they are force fitted onto shaft 30. The cover piece 34 is secured to the stator 10 by bolts 44 which are threaded into openings provided therefor. The actuator shaft 42 extends through a central bearing supporting opening 46 of the stator cover piece 34 and into a bearing recess 48 within the central pole piece 12 of the stator 10.

The gears 36, 38 and 40 may be advantageously chosen to give any desired speed and torque angle characteristics and, in addition, the gears may be spur gears, bevel gears, worm gears and other types based on certain geometrical configurations in order to achieve a wide variety of torque angle, acceleration and velocity functions for the main actuator shaft 42.

It should be realized that the stator 10 may be E-shaped, as in the embodiments illustrated in the drawings or cup-shaped with a square, rectangular, or round center pole section as desired. The rotors 26 and 28 are formed of magnetic material. A spring return device, or a comparable return mechanism may be connected either to the actuator shaft 42 or the rotor shafts 30 in order to return the rotor to the non-actuated position when the coil 18 is not energized as indicated in FIG. 2.

Thus, if it is desired to change the torque characteristics of each of the rotors 26 and 28, the curvature of the pole faces 24, as well as the cooperating faces 23 of the stator, may be machined to the desired configuration during manufacture to obtain the desired torque angle characteristics. When further adjustment is necessary, it may be accomplished by the simple expedient of removing one or more of the gears 36, 38 and 40 and replacing them with gears of different sizes and gear ratios. Thus, the solenoid construction provides a means for changing the turning force action on the actuator shaft 42 by an infinite number of ways.

While a specific embodiment of the invention has been shown and described in detail to illustrate the application of the invention principles, it will be understood that the invention may be embodied otherwise without departing from such principles.

What is claimed is:

1. A rotary electromagnetic actuator comprising a stator having at least two elongated pole pieces in spaced locations, a rotor rotatably mounted in a position between said pole pieces with the faces thereof cooperating with the faces of said pole pieces, an actuator shaft rotatably mounted on one of said pole pieces, means to energize said stator, and interchangeable drive means connecting said rotor and said actuator shaft to rotate the latter in proportion to rotation of said rotor during actuation of said actuator.

2. An actuator according to claim 1, wherein the one of said pole pieces on which said actuator shaft is mounted is provided with an electromagnetic coil winding which extends therearound.

3. An actuator according to claim 1, wherein said actuator shaft is rotatably mounted within a recess in one of said pole pieces.

4. A rotary electromagnetic actuator comprising a stator having a substantially E-shaped cross-section to provide at least three upstanding pole pieces, at least two rotors rotatably mounted between adjacent pole pieces of said stator, an actuator shaft centrally mounted above said stator, and gear means connecting each of said rotors with said actuator shaft to rotate the latter in proportion to the movement of said rotors upon actuation thereof, and means to energize said stator.

5. An actuator according to claim 4, wherein said actuator shaft is mounted on said central pole piece of said stator.

6. A rotary actuator comprising a stator having at least three upstanding pole pieces, a rotor rotatably mounted between adjacent pole pieces and including faces which cooperate with similar faces on said pole pieces, an actuator shaft rotatably mounted above said central pole piece, gear means connecting said rotors to said actuator shaft to rotate the latter, and means to energize said stator.

7. An actuator according to claim 6, including a stator cover piece extending over the tops of each of said pole pieces having spaced bearing openings therein, said rotors each having an upstanding shaft which extends into an associated bearing opening in said cover piece, a gear affixed to each of said rotor shafts and to said actuator shaft, said rotor gears being in meshing engagement with said actuator shaft whereby rotation of said rotors is transmitted through said gears to said actuator shaft.

8. A rotary solenoid capable of wide range torque angle characteristic adjustment comprising a stator having at least two spaced pole pieces, at least one rotor between said pole pieces having end faces cooperating with said pole pieces and contoured to give a predetermined torque of the rotor over the range of angular movement thereof between a non-actuated and a pulled-in actuated positon, means to energize said stator to move said rotor to an actuated position, an actuator shaft rotatably mounted upon one of said pole pieces, and interchangeable gear means connecting said rotor and said actuator shaft whereby to vary the torque delivered to said actuator shaft by said rotor.

9. A rotary solenoid capable of wide range torque angle characteristic adjustment comprising a substantially E-shaped stator, at least one rotor located between each two adjacent legs of said stator, each of the legs of said stator having pole faces cooperating with pole faces on the ends of said rotors, said rotor and stator pole faces being contoured to give a predetermined torque of said rotor over the angular movement of said rotor between a non-actuated and a pulled-in actuated position at which the gap between said pole faces is at a minimum, a rotatably mounted actuator shaft, and interchangeable gear means connecting each of said rotors and said actuator shaft whereby to vary the torque delivered to said shaft.

10. A rotary solenoid according to claim 9, wherein said actuator shaft is rotatably mounted on the central leg of said E-shaped stator, and means to energize said stator.

References Cited in the file of this patent
UNITED STATES PATENTS

| | | |
|---|---|---|
| 388,093 | Waddell | Aug. 21, 1888 |
| 1,722,749 | Holtz | July 30, 1929 |
| 2,492,197 | Schellens | Dec. 27, 1949 |
| 2,866,870 | Smiley | Dec. 30, 1958 |